J. W. CLOUD.
CAR WHEEL.
No. 10,869. Reissued Oct. 4, 1887.
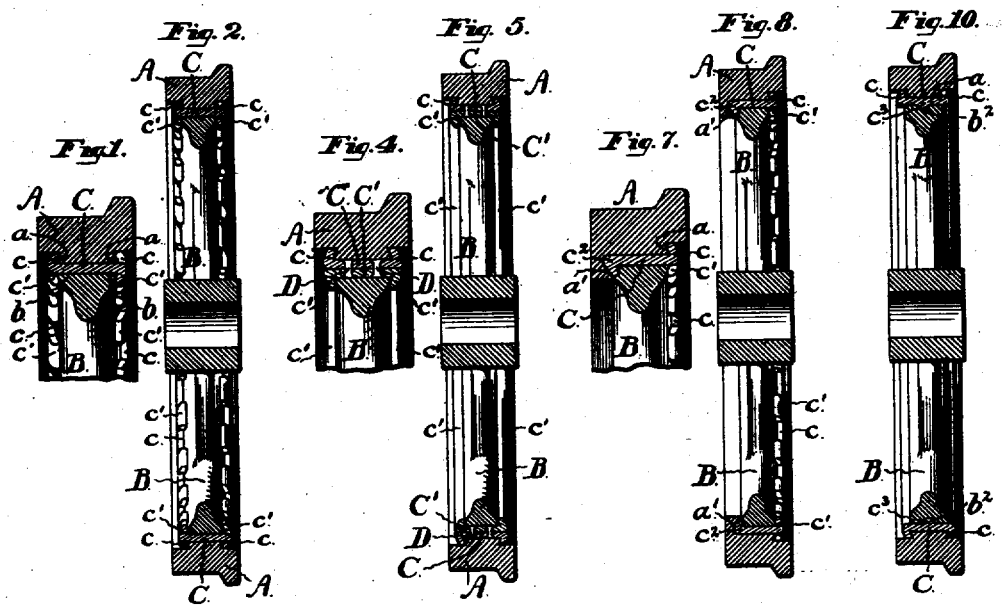
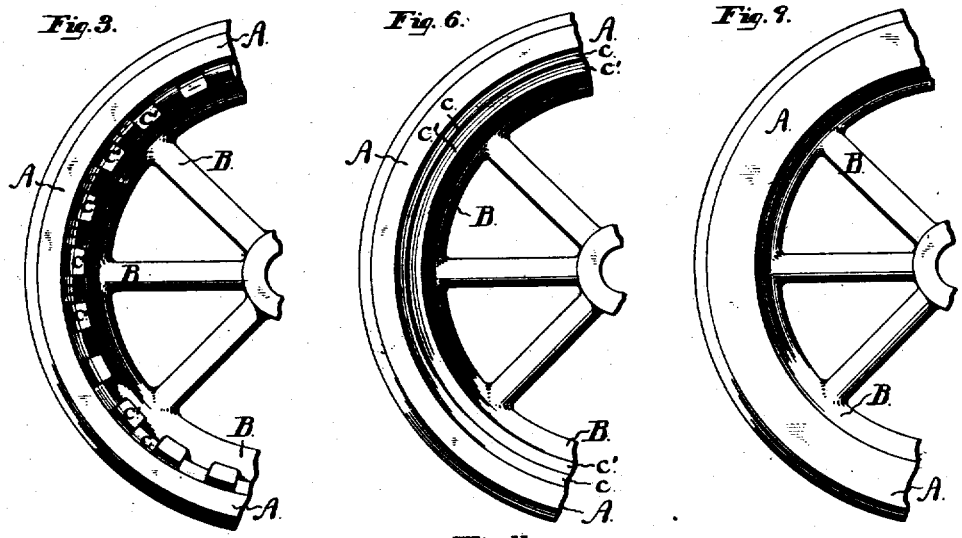
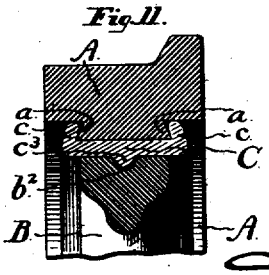
WITNESSES:
H. W. Hon Pome
Joshua Mallack, Jr.
INVENTOR
John W. Cloud
by his attorney
Francis T. Chambers
N. PETERS, Photo-Lithographer, Washington, D.C.

UNITED STATES PATENT OFFICE.

JOHN W. CLOUD, OF BUFFALO, NEW YORK.

CAR-WHEEL.

SPECIFICATION forming part of Reissued Letters Patent No. 10,869, dated October 4, 1887.

Original No. 355,681, dated January 11, 1887. Application for reissue filed August 30, 1887. Serial No. 248,301.

*To all whom it may concern:*

Be it known that I, JOHN W. CLOUD, of Buffalo, county of Erie, State of New York, and lately of Altoona, county of Blair, State of Pennsylvania, have invented a new and useful Improvement in Locomotive and Car Wheels, of which the following is a true and exact description, reference being had to the accompanying drawings, which form a part thereof.

My invention relates to those wheels in which the tire is made separate from the wheel-center; and its object is to provide a device which will hold the tire in place and prevent it from falling or becoming separated from the wheel-center even should it become loose or be broken.

My invention also enables me to dispense with the use of bolts as a means of securing the tire in place.

Reference being now had to the drawings which illustrate my invention, Figure 1 is a section through the rim of a wheel; Fig. 2, a central section of the same wheel, and Fig. 3 a front view of the same. Figs. 4, 5, and 6 are similar views of a wheel having a slightly-modified construction; Figs. 7, 8, and 9, similar views of another modified construction of wheel, and Figs. 10 and 11 sectional views of a wheel having another modification.

A is the wheel-tire; B, the wheel-center.

C is an intermediate plate, preferably made in one piece, but which need not be joined at its ends. It is inserted between the tire and the rim of the wheel-center before the tire is shrunk on, and is firmly clamped between them by the contraction of the tire. This plate C is made broader than the contact surfaces of the tire and wheel-center, so that it may be bent over one or both of them to clamp them together.

As shown in Figs. 1, 2, and 3, which illustrate my preferred form, the tire A is recessed at *a a* on both sides of its inner contact-surface, and the edges *b b* of the wheel-center B also recede at an acute angle to its contact-surface. The plate C is notched at both edges, and after it is clamped between the tire and wheel-center the sections *c* of its notched rim are hammered, pressed, or rolled over, so that they engage in the recesses *a a* of the tire, while the sections *c'* are similarly bent over the edges *b b* of the wheel-center.

In Figs. 4, 5, and 6 is illustrated a very similar construction, the only difference being that a second plate, C', is secured to the plate C by rivets D or otherwise, and the double plate being clamped between the tire and wheel-center, the edges *c* of the outer one are bent over the projecting edges of the tire, while the edges *c'* of the inner one are bent over the edges of the wheel-center.

In Figs. 7, 8, and 9 the tire is represented as having an inwardly-projecting flange, *a'*, with a projecting edge, between which and the inwardly-running edge *b* of the wheel-center the outer edge, $c^2$, of the plate C is clamped. The inner edge of plate C is notched, as in Fig. 1, and the alternate sections *c* and *c'* turned the first over the edge *a* of the tire and the latter over the edge *b* of the wheel-center.

In Figs. 10 and 11 the wheel-center B is shown as having an annular depression, $b^2$, running around its outer surface, and the plate C has a corresponding ridge, $c^3$, which fits into it, and by which the plate C is efficiently prevented from stepping off of the wheel-center, (or the depression may be in the plate C and the ridge on the wheel-center.) This danger being provided against, it is not essential that the plate C should clamp the wheel-center at its edges, and both of its projecting edges may be turned up to clamp the tire, as shown at *c c*.

As will be at once recognized, all of these modes of construction are practically the same in effect, the object being to hold the tire and wheel-center together at all points, so that the tire cannot escape or become displaced should it become loose or even should it break in two or more places.

As I have already pointed out, my intermediate metal strips perform the double function of preventing the tire from slipping laterally on the wheel-center and of preventing it from moving radially away from it when fractured; and it is of course evident that lateral slipping may be provided against by turning the flanges of the interposed plate or plates to an angle of not less than ninety degress, or by ridges like $c^3$, which construction would not afford any security against the tendency of the tire to fly away from its center in case of fracture.

I am aware that it has been suggested that lateral slipping of a wagon-wheel tire should be prevented by inserting little metal plates between the tire and its felly after the tire has been shrunk on, slots being cut in the felly to permit their insertion, and then turning little metal prongs at the ends of the plates in opposite directions and at right angles to the plane of the plates; but by my plan of securing the interposed plates between tire and wheel-center by the shrinking of the tire I avoid the necessity of cutting slots in the wheel-center (with the inevitable result of weakening the wheel) and produce a wheel with more than the usual strength and solidity, instead of less, as would be the case by the plan suggested.

Having now described my invention, what I claim as new, and desire to secure by Letters Patent, is—

1. As a new article of manufacture, a wheel having a tire and wheel-center, as described, and provided with one or more strips of metal clamped between the tire and wheel-center by the contraction of the tire, said interposed plate or plates engaging, by means of a flange or flanges, with a groove or grooves in the wheel-center, and having edge flanges bent over on the sides of the wheel, so as to engage with the tire, whereby the tire is prevented from slipping laterally on the wheel-center.

2. As a new article of manufacture, a wheel having a tire and wheel-center, as described, and provided with one or more strips of metal clamped between the tire and wheel-center by the contraction of the tire, said interposed plate or plates engaging, by means of a flange or flanges, with a groove or grooves in the wheel-center, and having edge flanges bent over on the sides of the wheel, so as to engage with recessed flanges on the tire, whereby the tire is prevented from slipping laterally or flying radially away from the wheel-center.

3. As a new article of manufacture, a wheel having a tire and wheel-center, as described, and provided with one or more strips of metal clamped between the tire and center, and having edges bent over on the sides of the wheel, so as to engage with recessed flanges on the tire and on the wheel-center and prevent the tire from slipping or flying away from the wheel-center, substantially as shown and described.

4. As a new article of manufacture, a wheel having a tire and wheel-center, as described, and provided with a strip of metal clamped between the tire and center, said interposed strip having its edges notched and bent alternately inward and outward to engage with recessed flanges in the wheel-center and tire, respectively, whereby the tire and center are clamped together, as and for the purpose specified.

5. The process of manufacturing wheels, which consists in inserting between the wheel-center and the tire a plate or plates of metal broader than the contact-surfaces of the tire and center, clamping said plate between the tire and center by the contraction of the tire, and then bending the projecting edges of said plate inward and outward to engage recessed flanges in the center and tire, respectively, and clamp them securely together.

JNO. W. CLOUD.

Witnesses:
A. G. THOMASON,
W. E. J. STORY.